· US009629142B2

(12) United States Patent
Zhang et al.

(10) Patent No.: US 9,629,142 B2
(45) Date of Patent: Apr. 18, 2017

(54) METHOD FOR INDICATING RESOURCE ASSIGNMENT, METHOD AND DEVICE FOR ASSIGNING RESOURCE

(71) Applicant: Huawei Technologies Co., Ltd., Shenzhen, Guangdong (CN)

(72) Inventors: Wen Zhang, Shenzhen (CN); Yongxia Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 14/491,610

(22) Filed: Sep. 19, 2014

(65) Prior Publication Data

US 2015/0009939 A1    Jan. 8, 2015

Related U.S. Application Data

(63) Continuation of application No. PCT/CN2013/072957, filed on Mar. 20, 2013.

(30) Foreign Application Priority Data

Mar. 20, 2012  (CN) .......................... 2012 1 0074624

(51) Int. Cl.
*H04W 72/04*   (2009.01)
*H04W 72/12*   (2009.01)
*H04L 5/00*    (2006.01)

(52) U.S. Cl.
CPC ......... *H04W 72/042* (2013.01); *H04L 5/0037* (2013.01); *H04L 5/0094* (2013.01); *H04W 72/1289* (2013.01); *H04L 5/0007* (2013.01)

(58) Field of Classification Search
None
See application file for complete search history.

(56) References Cited

U.S. PATENT DOCUMENTS

2009/0310476 A1* 12/2009 Seo .......................... H04B 7/12
                                                        370/203
2009/0316814 A1* 12/2009 Seo ...................... H04L 5/0007
                                                        375/260
(Continued)

FOREIGN PATENT DOCUMENTS

AU        2009261058 B2   12/2009
CN         101060702 A    10/2007
(Continued)

*Primary Examiner* — Min Jung
(74) *Attorney, Agent, or Firm* — Leydig, Voit & Mayer, Ltd.

(57) ABSTRACT

The present invention discloses a method for indicating resource assignment, comprising: obtaining, by a network side device, the number $N_0$ of a resource block RB that the network side device can assign to one UE and the one UE can schedule in maximum; calculating, by the network side device, a resource indication value RIV according to the number $N_0$ of the RB the network side device can assign to the UE and the UE can schedule in maximum and the number $N_{RB}$ of resource blocks corresponding to a bandwidth the network side device can assign to all UEs for use; and sending the calculated resource indication value RIV to the one user equipment. In contrast to the prior art, it may save the number of bits used by the resource indication and lower signaling cost.

16 Claims, 6 Drawing Sheets

(56) References Cited

U.S. PATENT DOCUMENTS

| | | | |
|---|---|---|---|
| 2010/0040001 A1* | 2/2010 | Montojo | H04W 72/04 370/329 |
| 2011/0085513 A1 | 4/2011 | Chen et al. | |
| 2011/0113433 A1* | 5/2011 | Koyanagi | H04L 5/0039 718/104 |
| 2011/0134861 A1* | 6/2011 | Seo | H04W 72/1289 370/329 |
| 2011/0201341 A1* | 8/2011 | Choudhury | H04W 72/0426 455/450 |
| 2012/0087331 A1 | 4/2012 | Seo et al. | |
| 2013/0089063 A1* | 4/2013 | Yang | H04L 5/0023 370/329 |
| 2013/0155987 A1* | 6/2013 | Lan | H04L 1/0027 370/329 |

FOREIGN PATENT DOCUMENTS

| | | |
|---|---|---|
| CN | 101296508 A | 10/2008 |
| CN | 102036387 A | 4/2011 |
| CN | 102057735 A | 5/2011 |
| EP | 2175578 A1 | 4/2010 |
| WO | WO 2010140828 A2 | 12/2010 |
| WO | WO 2011134161 A1 | 11/2011 |

\* cited by examiner

METHOD FOR INDICATING RESOURCE ASSIGNMENT, METHOD AND DEVICE FOR ASSIGNING RESOURCE

CROSS-REFERENCE TO RELATED APPLICATIONS

This application is a continuation of International Patent Application No. PCT/CN2013/072957, filed on Mar. 20, 2013, which claims priority to Chinese Patent Application No. 201210074624.9, filed on Mar. 20, 2012, both of which are hereby incorporated by reference in their entireties.

TECHNICAL FIELD

The present invention relates to the field of communications technologies, particularly to a method for indicating resource assignment, a method and a device for assigning a resource.

BACKGROUND

Machine to machine (M2M) is an internet where objects are interconnected, and it can connect all the objects to the Internet via an information sensing device to realize intellectual identification and management. The $3^{rd}$ generation partnership project (3GPP) especially establishes a project team "Provision of low-cost MTC UEs based on LTE", studying enhancement or optimization necessary to be performed on the mobile communications network with respect to an introduction of a low-cost machine type communication (MTC) user equipment (UE).

Up to the present, the project team has recognized several directions capable of reducing the UE cost, such as reducing the UE cost by reducing a bandwidth supported by the UE. With regard to reducing the bandwidth supported by the UE, there are two approaches under discussion by the project team: one is that the UE can only support narrowband, and the narrowband is baseband; another is that the UE is capable of supporting broadband, however, the number of a resource block (RB) that a system can assign to the UE and the UE can schedule is limited, such as 6 RBs. The above changes lead to possible changes on the way of indicating resource assignment in downlink control information (DCI).

SUMMARY

Embodiments of the present invention provide a method for indicating resource assignment, a method for assigning a resource and a corresponding device so as to solve the problem of how to perform resource assignment or resource assignment indication for a UE.

A method for indicating resource assignment includes:

obtaining, by a network side device, the number $N_0$ of a resource block RB, which the network side device can assign to one UE and the one UE can schedule in maximum;

calculating, by the network side device, a resource indication value RIV according to the number $N_0$ of the RB that the network side device can assign to the UE and the UE can schedule in maximum and the number $N_{RB}$ of resource blocks corresponding to a bandwidth which the network side device can assign to all UEs for use; and sending the calculated resource indication value RIV to the one user equipment.

A network side device includes:

an obtaining module, configured to obtain the number $N_0$ of a resource block RB which the network side device can assign to one UE and the one UE can schedule in maximum;

a calculating module, configured to calculate a resource indication value RIV according to the number $N_0$ of the RB that the network side device can assign to the UE and the UE can schedule in maximum and the number $N_{RB}$ of resource blocks corresponding to a bandwidth which the network side device can assign to all UEs for use; and a sending module, configured to send the calculated resource indication value RIV to the one user equipment.

A method for obtaining resource assignment includes:

receiving, by a user equipment UE, a resource indication value RIV sent by a network side device, where the resource indication value RIV refers to a resource indication value RIV calculated by the network side device according to the number $N_0$ of an RB which the network side device can assign to the UE and the UE can schedule in maximum and the number $N_{RB}$ of resource blocks corresponding to a bandwidth which the network side device can assign to all UEs for use; and obtaining, by the UE, a location of a resource assigned to the user equipment and a length $L_{CRBs}$ of the resource according to the received RIV.

A user equipment includes:

a receiving module, configured to receive a resource indication value RIV sent by a network side device, where the resource indication value RIV refers to a resource indication value RIV calculated by the network side device according to the number $N_0$ of an RB which the network side device can assign to the UE and the UE can schedule in maximum and the number $N_{RB}$ of resource blocks corresponding to a bandwidth which the network side device can assign to all UEs for use; and a resource obtaining module, configured to obtain a location of a resource assigned to the UE and a length $L_{CRBs}$ of the resource according to the received RIV.

A method for assigning a resource, when a user equipment UE can only support narrowband in downlink, and the narrowband is baseband and corresponds to $N_0$ resource block RB, the method includes:

dividing an entire system bandwidth into a plurality of subbands to make a bandwidth of each subband be $N_0$;

selecting one subband for transmitting a physical downlink control channel PDCCH, and assigning a resource of a physical downlink shared channel PDSCH to the UE within the one subband by using a way of a bitmap or a way of continuous resource assignment.

A network side device includes:

a dividing module, configured to divide, when a user equipment UE can only support narrowband in downlink, and the narrowband is baseband and corresponds to $N_0$ resource block RB, an entire system bandwidth into a plurality of subbands to make a bandwidth of each subband to be $N_0$;

an assigning module, configured to select one subband for transmitting a physical downlink control channel PDCCH, and assign a resource of a physical downlink shared channel PDSCH to the UE within the one subband by using a way of a bitmap or a way of continuous resource assignment.

A method for assigning a resource, when a physical downlink control channel PDCCH of a user equipment UE can support broadband, but a physical downlink shared channel PDSCH of the UE can only schedule narrowband and the narrowband is baseband and corresponds to $N_0$ resource block RB, the method includes:

dividing an entire system bandwidth into a plurality of subbands to make a bandwidth of each subband to be $N_0$;

selecting one subband for transmitting the PDCCH, and assigning a resource of the PDSCH within the one subband by using a way of a bitmap or a way of continuous resource assignment.

A network side device, comprising:

a dividing module, configured to divide, when a physical downlink control channel of a user equipment UE can support broadband, but a physical downlink shared channel PDSCH of the UE can only schedule narrowband and the narrowband is baseband and corresponds to $N_0$ resource block RB, an entire system bandwidth into a plurality of subbands to make a bandwidth of each subband to be $N_0$;

an assigning module, configured to select one subband for transmitting the PDCCH and assign a resource of the physical downlink shared channel PDSCH to the UE within the one subband by using a way of a bitmap or a way of continuous resource assignment.

A method for indicating resource assignment includes:

obtaining, by a network side device, the number $N_0$ of a resource block RB where the number $N_0$ of the RB is the number of an RB which the network side device can assign to one UE and the one UE can schedule in maximum;

calculating, by the network side device, a resource indication value RIV according to the $N_0$ of the UE and the number $N_{RB}$ of RBs, where the number $N_{RB}$ of the RBs is a number of RBs corresponding to a bandwidth which the network side device can assign to all UEs for use, and the all UEs are UEs accessing to the network side device; and sending, by the network side device, the RIV to the one UE.

A network side device includes:

an obtaining module, configured to obtain the number $N_0$ of a resource block RB where the number $N_0$ of the RB is the number of an RB which the network side device can assign to one UE and the one UE can schedule in maximum;

a calculating module, configured to calculate a resource indication value RIV according to the number $N_{RB}$ of RBs corresponding to a bandwidth which the network side device can assign to all UEs for use and the $N_0$ obtained by the obtaining module, where all the UEs are UEs accessing to the network side device; and a sending module, configured to send the RIV calculated by the calculating module to the one UE.

A method for obtaining resource assignment includes:

receiving, by a user equipment UE, a resource indication value RIV sent by a network side device, where the RIV is calculated by the network side device according to the number $N_0$ of a resource block RB and the number $N_{RB}$ of RBs, the number $N_0$ of the RB is the number of RB which the network side device can assign to one UE and the one UE can schedule in maximum, and the number $N_{RB}$ of the RBs is the number of RBs corresponding to a bandwidth which the network side device can assign to all UEs accessing to the network side device for use; and obtaining, by the UE, a location of a resource assigned to the user equipment and a length $L_{CRBs}$ of the resource according to the received RIV.

A user equipment UE includes:

a receiving module, configured to receive a resource indication value RIV sent by a network side device, where the RIV is calculated by the network side device according to the number $N_0$ of a resource block RB and the number $N_{RB}$ of RBs, the number $N_0$ of the RB is the number of an RB which the network side device can assign to one UE and the one UE can schedule in maximum, and the number $N_{RB}$ of the RBs is the number of RBs corresponding to a bandwidth which the network side device can assign to all UEs accessing to the network side device for use; and a resource obtaining module, configured to obtain a location of a resource assigned to the UE and a length $L_{CRBs}$ of the resource according to the RIV received by the receiving module.

A method for assigning a resource, if a user equipment UE can only support narrowband in downlink, and the narrowband is baseband and corresponds to $N_0$ resource block RB, the method includes:

selecting, by a network side device, one subband from a plurality of subbands for transmitting a physical downlink control channel PDCCH, wherein the plurality of subbands are obtained by dividing an entire system bandwidth, and a bandwidth of each subband of the plurality of subbands corresponds to the $N_0$ resource block RB; and assigning, by the network side device, a resource of a physical downlink shared channel PDSCH to the UE within the one subband by using a way of a bitmap or a way of continuous resource assignment.

A network side device, the network side device includes:

an assigning module, configured to select, if the user equipment UE can only support narrowband in downlink, and the narrowband is baseband and corresponds to $N_0$ resource block RB, one subband from a plurality of subbands for transmitting a physical downlink control channel PDCCH, where the plurality of subbands is obtained by dividing an entire system bandwidth, and a bandwidth of each subband of the plurality of subbands corresponds to the $N_0$ resource block RB; and assign a resource of a physical downlink shared channel PDSCH to the UE within the one subband by using a way of a bitmap or a way of continuous resource assignment.

A method for assigning a resource, if a physical downlink control channel PDCCH of a user equipment UE can support broadband, but the physical downlink shared channel PDSCH of the UE can only schedule narrowband and the narrowband is baseband and corresponds to $N_0$ resource block RB, the method includes:

selecting, by a network side device, one subband from a plurality of subbands for transmitting the PDCCH, where the plurality of subbands is obtained by dividing an entire system bandwidth, and a bandwidth of each subband from the plurality of subbands corresponds to the $N_0$ resource block RB; and assigning, by the network side device, a resource of the PDSCH to the UE within the one subband by using a way of a bitmap or a way of continuous resource assignment.

A network side device includes:

an assigning module, configured to select, if a physical downlink control channel PDCCH of a user equipment UE can support broadband, but a physical downlink shared channel PDSCH of the UE can only schedule narrowband, and the narrowband is baseband and corresponds to $N_0$ resource block RB, one subband from a plurality of subbands for transmitting the PDCCH, wherein the plurality of subbands are obtained by dividing an entire system bandwidth, and a bandwidth of each subband from the plurality of subbands corresponds to the $N_0$ resource block RB; and assign a resource of the PDSCH to the UE within the one subband by using a way of a bitmap or a way of continuous resource assignment.

Embodiments of the present invention provide a method for indicating resource assignment, a method for assigning a resource and corresponding devices, in calculating the resource indication value, the network side device in a communication system can assign to one UE the number $N_0$ of the RB which the UE can schedule in maximum, realizing resource assignment or resource assignment indication for the UE, especially for the low cost UE, thus being capable of saving the number of bits used for the resource indication and reducing the signaling cost.

DESCRIPTION OF EMBODIMENTS

The embodiments of the present invention provide a method for indicating resource assignment, a method for assigning a resource and devices. In order to better clarify the objective, technical solutions and advantages of the embodiments of the present invention, the embodiment of the present invention are further described in the following with combination of the embodiments and drawings.

It should be noted that, under a circumstance without conflict, the embodiments of the present invention and features in the embodiments can be arbitrarily combined with each other.

Embodiment 1

Figure 1:
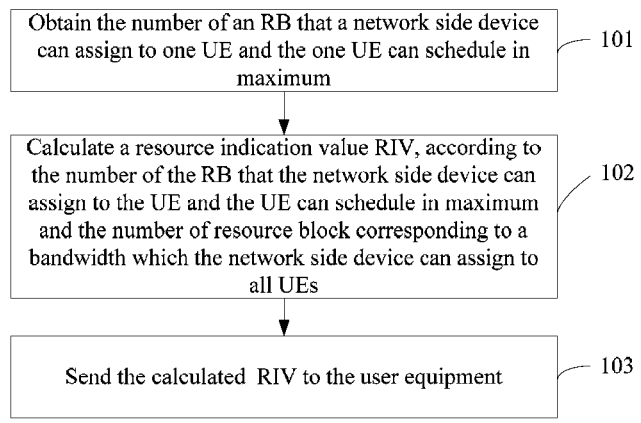
FIG. 1 is a flow diagram of a method for indicating resource assignment according to an embodiment of the present invention.

The present embodiment assumes that a UE can support broadband, but the number of the RBs which the network side device of a communication system can assign to one UE and the one UE can schedule in maximum is limited. With respect to this type of UE, a method for indicating resource assignment provided by the present embodiment includes the following steps as shown in FIG. 1.

101, Obtain the number $N_0$ of an RB that a network side device of a communication system can assign to one UE and the one UE can schedule in maximum.

In the step, the network side device of the communication system can know the UE is a low-cost UE via information interaction with the UE, and then knows the number $N_0$ of the RB that the network side device of the communication system is able to assign to the UE and the UE can schedule in maximum. The network side device mentioned may be a base station (for example, Node B).

According to the description, the number of the resource block (RB) which a network side device of a communication system is able to assign to a UE and the UE can schedule in maximum is denoted as $N_0$, the number of resource blocks corresponding to the bandwidth which the communication system can assign to all UEs for use is denoted as $N_{RB}$, and thus $N_0 < N_{RB}$. Where, the number of a resource block corresponding to the downlink bandwidth which the communication system can assign to the UE for scheduling can be denoted as $N_{RB}^{DL}$, and the number of the resource block corresponding to the uplink bandwidth is denoted as $N_{RB}^{UL}$.

The above communication system may be a long term evolution (LTE) system. The LTE system defines a physical downlink control channel (PDCCH), and the PDCCH is used for carrying downlink control information (DCI). The DCI can be used for indicating resource assignment on a physical downlink shared channel (PDSCH) and a physical uplink shared channel (PUSCH).

102, Calculate a resource indication value RIV according to the number $N_0$ of the RB which the network side device of the communication system can assign to the one UE and the UE can schedule in maximum and the number $N_{RB}$ of the resource blocks corresponding to a bandwidth which the network side device of the communication system can assign to all UEs for use.

The network side device can assign a resource to the UE by using a way of continuous resource assignment, the assigned resource can be indicated by two parameters of a location of the resource and a length of the resource. The network side device indicates the location of the resource assigned to the UE and the length of the resource to the UE via a resource indication value (RIV) in DCI. The location of the resource assigned to the UE can be represented by a sequence number $RB_{START}$ of a starting resource block of continuous resource blocks assigned to the UE for scheduling; the length of the resource assigned to the UE can be represented by the number $L_{CRBs}$ of the continuous resource block assigned to the UE for scheduling. It is easy to understand that $RB_{START}$ is the sequence number of the starting resource block in the $N_{RB}$ resource blocks corresponding to a bandwidth assigned to the UE for scheduling, $L_{CRBs}$ is no greater than $N_0$, i.e., the number $L_{CRBs}$ of the continuous resource block assigned to the UE for scheduling is less than or equal to the number of the resource block (RB) which the network side device of the communication system can assign to the UE in maximum and which the UE can schedule.

It should be noted that the location of the resource assigned to the UE is not limited to be represented by the sequence number of the starting resource block of the continuous resource block assigned to the UE, for example, it can be represented by the sequence number of an ending resource block in the continuous resource block assigned to the UE, or be represented by the sequence number of a certain resource block assigned to the UE, as long as the UE is able to determine the assigned resource according to the location of the resource and the length of the resource.

The RIV represents one state among all possible combinations of ($RB_{START}$, $L_{CRBs}$). The RIV sent to the UE indicates the location of the resource assigned to the UE for scheduling and the length of the resource. After receiving the RIV, the UE is able to determine the resource that it will use. If the RIV is represented in binary, the number ($n_{bit}$) of bits required by the resource indication value RIV needs to enable the number of the RIVs, which can be represented by the number of bits, to represent all possible combinations of ($RB_{START}$, $L_{CRBs}$). In other words, the number of states of the ($RB_{START}$, $L_{CRBs}$) combination represents the number of possible combinations of ($RB_{START}$, $L_{CRBs}$), and the number ($n_{bit}$) of bits required by the RIV needs to be able to represent how many bits are required for this number of the states.

When the UE is an ordinary UE that can support broadband in the prior art, when performing resource assignment according to the continuous resource assignment way, the number of bits required for denoting the RIV is determined by $N_{RB}$, at this moment, the number ($n_{bit}$) of bits required for denoting the RIV may be represented by a formula $n_{bit}=\lceil\log_2(N_{RB}\times(N_{RB}+1)/2)\rceil$. In the formula, $\lceil\ \rceil$ refers to round up.

An RIV calculation formula requires to be designed according to the calculated number of bits, to enable the calculated RIV to be able to represent any one of all possible combinations of ($RB_{START}$, $L_{CRBs}$), therefore, the number $n_{bit}$ of bits required by the RIV should satisfy $2^{n_{bit}}$, at least equals the number of combinations of ($RB_{START}$, $L_{CRBs}$) or is at least no less than a value which is equal to the number of combinations of ($RB_{START}$, $L_{CRBs}$) minus 1. Taking $N_{RB}=50$ as an example, according to the prior art, the number of the RB which the network device of the communication system can assign to the UE and the UE can schedule is $N_0=N_{RB}$, at this moment, the number $n_{bit}$ of bits required for denoting the RIV is $\lceil\log_2(50\times51/2)\rceil=11$, then the RIV calculated with the RIV calculation formula requires at least $2^{11}$ values. According to the prior art, the RIV is calculated according to $N_{RB}$, one RIV calculation formula is: when $L_{CRBs}-1\leq\lfloor N_{RB}/2\rfloor$, $RIV=N_{RB}(L_{CRBs}-1)+RB_{START}$, otherwise, $RIV=N_{RB}(N_{RB}-L_{CRBs}+1)+(N_{RB}-RB_{START}-1)$, where $L_{CRBs}\geq 1$, and $L_{CRBs}$ cannot exceed $N_{RB}-RB_{start}$.

According to the present embodiment, although the UE can support the broadband, the UE cannot schedule all the RBs corresponding to the bandwidth assigned by the communication system for all UEs to use, and the UE can only schedule $L_{CRBs}$ RB; and, because the UE can support only $N_0$ resource blocks in maximum, when performing resource assignment for this type of UE according to the continuous resource assignment way, the number of bits required for denoting the RIV cannot only be calculated according to the $N_{RB}$, and the effect of $N_0$ should be taken into consideration, i.e., it is required to calculate the number $n_{bit}$ of bits required for denoting the RIV according to both $N_{RB}$ and $N_0$. Represented by a formula, the number of bits required for performing resource indication for a UE which can only schedule $L_{CRBs}$ RB is $n_{bit}=\lceil\log_2((N_{RB}-N_0+1)*N_0+N_0(N_0-1)/2)\rceil$. Take $N_{RB}=50$ and $N_0=6$ as an example, according to the present embodiment, the number of bits required for denoting the RIV is $n_{bit}=\lceil\log_2((50-6+1)\times 6+6\times(6-1)/2)\rceil=9$.

It can be seen that, when the number of the RB which the network side device of a communication system can assign to one UE and the one UE can schedule in maximum is limited, i.e., it is less than all RBs corresponding to the bandwidth that the communication system can assign to all UE for use, if resource assignment is performed for the UE, since the number of states of the ($RB_{START}$, $L_{CRBs}$) combination reduces, then the number of bits required for denoting the RIV may reduce. Because, according to the prior art, when calculating the RIV, it only takes into account the number of all RBs corresponding to the bandwidth which is able to be assigned to all UEs for use, i.e. $N_{RB}$, the number of bits required is relatively more. When the number of the RB that the network side device of a communication system is able to assign to a UE and the UE can schedule is limited, if still using the RIV calculation formula according to the prior art, the RIV may become discontinuous and need relatively more bits, which wastes signaling cost. For example, with regard to an ordinary UE, assuming that the number of bits required by the way of current continuous resource assignment is 3, which represents 8 states, the RIV calculated with the current RIV calculation formula may be any one of 8 numbers from 0 to 7. With regard to a UE where the number of the RB which the network side device of a communication system is able to assign to the UE and the UE can schedule in maximum is limited, assuming that the number of bits required in the continuous resource assignment way reduces to 2, there are only 4 states needed, according to the current RIV calculation formula, only 4 numbers of the 8 numbers from 0 to 7 are required to represent all the states, and the other 4 numbers not in use are wasted. Therefore, the way of calculating the RIV is in need of improvement.

The design principle of the RIV calculation formula is to make the number of RIV values calculated with the RIV calculation formula be consistent with the number of states which can be represented by the number of bits required by the RIV. The consistency may indicate that the number of the RIV values calculated with the RIV calculation formula at least equals the number of states that can be represented by the number of bits required by the RIV. According to the design principle, a plurality of new RIV calculation formulas can be designed. Where, based on the above design principle, the new RIV calculation formula must take into account the effect of $N_0$, i.e., it requires to calculate the RIV according to both $N_{RB}$ and $N_0$.

The present embodiment provides an example of calculating the RIV which can calculate the RIV according to the following formulas.

1031, compare $RB_{START}$ and $N_{RB}-N_0$;

1032, if $RB_{START}\leq N_{RB}-N_0$, then let $RIV=RB_{START}N_0+L_{CRBs}-1$, or, let $RIV=RB_{START}N_0+L_{CRBs}+1+a$, where, $L_{CRBs}\leq N_0$, a is an integer constant;

The value of a enables the value of the RIV calculated with the above formula to be within [0,NRB], the value range of a is $0\leq a\leq N_{RB}-[(N_{RB}-N_0)N_0+N_0-1]$, i.e., the maximum value of a is the value of the RIV when $RB_{START}=N_{RB}-N_0$ and $L_{CRBs}=N_0$.

1033, if $RB_{START}>N_{RB}-N_0$, further compare $L_{CRBs}-1$ and $\lfloor(N_0-1)/2\rfloor$;

and if $L_{CRBs}-1\leq\lfloor(N_0-1)/2\rfloor$, then let $RIV=N_0(N_{RB}-N_0+1)+(N_0-1)(L_{CRBs}-1)+RB_{START}-(N_{RB}-N_0+1)$, or, let $RIV=N_0(N_{RB}-N_0+1)+(N_0-1)(L_{CRBs}-1)+RB_{START}-(N_{RB}-N_0+1)+b$;

Where $1\leq L_{CRBs}\leq N_{RB}-RB_{START}$, b is an integer constant and can either be a positive integer or a negative integer.

If $L_{CRBs}-1>\lfloor(N_0-1)/2\rfloor$, let $RIV=N_0(N_{RB}-N_0+1)+(N_0-1)(N_0-L_{CRBs})+N_{RB}-RB_{START}-1$, or, let $RIV=N_0(N_{RB}-N_0+1)+(N_0-1)(N_0-L_{CRBs})+N_{RB}-RB_{START}-1+c$;

Where $1\leq L_{CRBs}\leq N_{RB}-RB_{start}$, c is an integer constant and can either be a positive integer or a negative integer.

The values of the above b and c are determined according to the value of a, to enable the RIV value calculated by the above formula is also within [0, $N_{RB}$] when $RB_{START}>N_{RB}-N_0$.

For example, assuming that $N_{RB}=40$, if $RB_{START}\leq N_{RB}-N_0$, the RIV calculated according to $RIV=RB_{START}N_0+L_{CRBs}-1$ is within the range of [0, 19], if $RB_{START}>N_{RB}-N_0$, the RIV calculated according to $RIV=N_0(N_{RB}-N_0+1)+(N_0-1)(L_{CRBs}-1)+RB_{START}-(N_{RB}-N_0+1)$ and $RIV=N_0(N_{RB}-N_0+1)+(N_0-1)(N_0-L_{CRBs})+N_{RB}-RB_{START}-1$ is within the range of [5, 24]; when $RB_{START}\leq N_{RB}-N_0$, if the RIV is calculated by $RIV=RB_{START}N_0+L_{CRBs}-1+a$, the RIV value calculated under such condition is adjusted to be within the range of [5,24] by a; then the value of b should satisfy that the value of $\mod_{N_{RB}}[N_0(N_{RB}-N_0-1)+(N_0-1)(L_{CRBs}-1)+RB_{START}-(N_{RB}-N_0+1)+b]$ is within the range of [0, 4] or [24, 40]; the value of c also should satisfy that the value of $\mod_{N_{RB}}[N_0(N_{RB}-N_0+1)+(N_0-1)(N_0-L_{CRBs})+N_{RB}-RB_{START}-1+c]$ is within the range of [0, 4] or [24, 40]. Where, mod represents a modulus operation on $RIV=N_0(N_{RB}-N_0+1)+(N_0-1)(L_{CRBs}-1)+RB_{START}-(N_{RB}-N_0+1)+b$ or $RIV=N_0(N_{RB}-N_0+1)+(N_0-1)(N_0-L_{CRBs})+N_{RB}-RB_{START}-1+c$ with respect to $N_{RB}$.

The above calculation formula of the RIV can be written as the following form using concise and formalized mode:

if $RB_{START} \leq N_{RB} - N_0$ $$RIV = RB_{START}N_0 + L_{CRBs} - 1, \text{ where } L_{CRBs} \leq N_0$$

else if $L_{CRBs} - 1 \leq \lfloor(N_0-1)/2\rfloor$ then $$RIV = N_0(N_{RB} - N_0 + 1) + (N_0 - 1)(L_{CRBs} - 1) + RB_{START} - (N_{RB} - N_0 + 1)$$

else $$RIV = N_0(N_{RB} - N_0 + 1) + (N_0 - 1)(N_0 - L_{CRBs}) + N_{RB} - RB_{START} - 1$$

where $L_{CRBs} \geq 1$ and shall not exceed $N_{RB} - RB_{start}$

It should be noted that the above calculation formula of the RIV is only an example that the present invention provides, according to the design principle, a plurality of new RIV calculation formulas can also be designed. The method according to the embodiments of the present invention can calculate the RIV using any RIV calculation formulas designed according to the above design principle.

103, send the calculated resource indication value RIV to the UE.

The network side device sends the calculated resource indication value RIV to the UE so as to realize the indication of the assigned resource.

The UE can calculate, for example, a logical sequence number of the starting RB and the number of RB, of the assigned resource, according to the received RIV. In general, the RIV calculated according to the above RIV calculation formula is decimal, the network side device can convert the decimal RIV into a binary one, then, sends the binary RIV to the UE. The RIV is carried in DCI and is transmitted to the UE via a PDCCH.

The method according to the present embodiment can be used for indicating downlink PDSCH resource assignment, and can also be used for indicating uplink PUSCH resource assignment. When the method is used to assign a downlink resource to the UE, the $RB_{START}$ and $L_{CRBs}$ are the staring location and the length of the PDSCH resource assigned to the UE, respectively. When the method is used to assign a downlink resource to the UE, the $RB_{START}$ and $L_{CRBs}$ are the starting location and the length of the PUSCH resource assigned to the UE. The starting location refers to the logical sequence number of the starting resource block, and the length refers to the number of the continuous resource block included in the assigned resource.

Where, the RIV can be carried in the DCI to be transmitted to the UE, and there is a specified field in the DCI for indicating the RIV. Optionally, in the present embodiment, the DCI used for the uplink and downlink resource assignment indication can respectively use only one format, where one DCI format used for indicating PDSCH resource assignment is named as a first DCI, and another DCI format used for indicating PUSCH resource assignment is named as a second DCI.

According to an embodiment provided by the present invention, the DCI format may use an existing DCI format, for example, the first DCI uses Format 0, and the second DCI uses Format 1A. At this moment, there will be some spare bits or states in the DCI, the number of the spare bits or states can be obtained according to protocols. The embodiment will be illustrated by taking 2 spare bits as an example, however, not limited to 2 spare bits.

The network side device may set all the spare bits to either 0 or 1, for identifying that the present DCI is to schedule a UE with limited resource so as to lower the DCI missed detection probability of the UE.

The network side device may also indicate discontinuous reception (Discontinuous Reception, DRX) information using a spare bit or state, including any one or any combination of the following modes:

First way: the spare bit may indicate a longer sleep time of the DRX, where the longer sleep time of the DRX indicates it is longer than a sleep time of the DRX specified in the existing LTE, for example, "00" represents 1 hour of sleep, "11" identifies 2 hours of sleep, etc.

Or

Second way: the spare bit may indicate whether to use a longer sleep time of the DRX, for example, "11" indicates the UE may use the longer sleep time of the DRX, "00" indicates the UE does not use longer sleep time of DRX, etc.

Or

Third way: the spare bit may indicate when to start a longer sleep time of the DRX, for example, "00" indicates to start to sleep at the $10^{th}$ subframe after the subframe, "11" indicates to start to sleep at the $50^{th}$ subframe after the subframe, etc.

In the above modes, the DCI missed detection probability of the UE may be lowered by the spare bit indicating different sleep times or indicating different times to start the sleep time, etc.

According to another embodiment provided in the present invention, the DCI format may be redesigned. Where, in order to reduce the number of times that a UE performs blind detection in a specialized search space, a manner of filling a padding bit with 0 or 1 can be adopted to make the number of bits of the first DCI equal the number of bits of the second DCI. The padding bit may be all set to 0, or to 1, or to 0 and 1, for example, may be filled in combination with the usage ways of the spare bit according to the above embodiment. Therefore, when the UE performs blind detection in the specialized search space, only the DCI format of one type of length needs to be detected, compared with the solution in the prior art which requires DCI formats of at least two types of length, the number of times of blind detection is reduced to half, and thereby the power consumption of the UE can be reduced.

In addition, the transmission performance of the PDCCH can be increased by repeating the information bit in the DCI. By repeating the information bit in the DCI, the same information can be transferred twice, thus improving correction capability and demodulation capability, realizing the improvement on the transmission capability of the PDCCH. For example, the spare bit in the field of resource block assignment can be used for the repetition of the field, or the repetition of other key fields. The repetition may refer to a repetition of a single bit, for example, "01" is repeated as "0011"; may also refer to a repetition of a plurality of bits, for example, "01" is repeated as "0101"; or, may refer to other types of repetition.

In summary, the embodiment of the present invention provides a method for indicating resource assignment for a UE under a condition that the number of RB which the network side device of the communication system can assign to one UE and the one UE can schedule in maximum is limited, the method takes into account the number of the RB which the network side device of the communication system can assign to the UE and the UE can schedule in maximum during the calculation of a resource indication value, and thus is capable of saving the number of bits used for the resource indication and lowering the signaling cost. The executive entity of the method for indicating resource assignment according to the embodiment may be a base station. In addition, by conducting a different design for the DCI format used to transmit the RIV, the present invention may achieve a reduction of the DCI missed detection probability of the UE, a reduction of the power consumption of the UE, an improvement of correction capability and demodulation capability, and an enhancement of the transmission capability of the PDCCH.

In addition, the present embodiment may assign continuous PRBs or VRBs to the UE. Optionally, if the UE can support scheduling of discontinuous physical resource block (Physical Resource Block, PRB), the method according to the present embodiment may indicate whether to use a distributed VRB mapping by working with a localized/distributed virtual resource block (VRB) assignment flag. At this moment, the RBs assigned in the continuous assignment way is VRB, and the RIV indicates the assignment way of the VRB. At this time, the UE and the network side device have the one-to-one mapping relationship between the VRB and the PRB. After obtaining the RIV and calculating the assigned VRB according to the RIV, the UE can obtain the location of the PRB according to the mapping relationship. Therefore, when continuous VRB is assigned, with the cooperation of the Localized/Distributed VRB assignment flag for indicating whether to use the distributed VRB mapping, it can be achieved to assign the discontinuous distributed PRB to the UE. In particular, RIV is calculated using the method according to the embodiments of the present invention, the RIV is sent to the user equipment, where the RIV is used to indicate the VRB; meanwhile, the Localized/Distributed VRB assignment flag is used to indicate the usage of a distributed VRB mapping, and the user equipment is informed of the mapping relationship existing between the VRB and the PRB.

Embodiment 2

Figure 2:
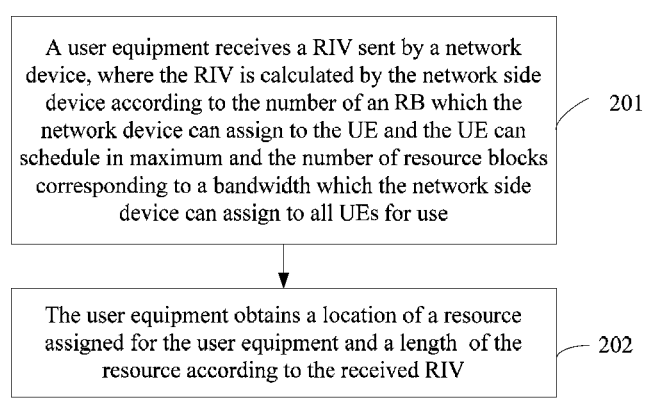
FIG. 2 is a flow diagram of a method for obtaining resource assignment according to an embodiment of the present invention.

In view of the method for indicating resource assignment provided by the above embodiment, the present embodiment also provides a method for obtaining resource assignment. As shown in FIG. 2, the method includes following steps.

Step 201, a user equipment receives a resource indication value RIV sent by a network side device, where the resource indication value RIV is a resource indication value that is calculated by the network side device according to the number $N_0$ of an RB which the network side device can assign to the UE and the UE can schedule in maximum and the number $N_{RB}$ of resource blocks corresponding to a bandwidth which the network side device can assign to all UEs for use.

In the step, the number $n_{ba}$ of binary bits for denoting the calculated RIV satisfies $n_{bit}=\lceil \log_2((N_{RB}-N_0+1)\times N_0+N_0(N_0-1)/2)\rceil$.

Where, the network side device carries the resource indication value RIV in downlink control information DCI of a physical downlink control channel PDCCH;

The UE receives the RIV by receiving the downlink control information DCI.

Step 202, the user equipment obtains a location of a resource assigned to the user equipment and a length of the resource according to the received RIV.

In this step, when the network side device calculates the RIV, each value of RIV corresponds to a state of the $(RB_{START}, L_{CRBs})$ combination; correspondingly, the UE can store a correspondence between the RIV and $(RB_{START}, L_{CRBs})$, therefore, after receiving the RIV, it can obtain the location of the resource assigned to the user equipment and the length of the resource according to the received RIV.

According to the solution provided by the embodiment, after receiving the RIV carried by the DCI, the UE can calculate the assigned resource according to the RIV, for example, it can calculate the logical sequence number of a starting RB of the assigned resource, and the length of the assigned resource, i.e., the number of the RB included in the assigned resource.

In another embodiment, when the length $L_{CRBs}$ of the resource assigned by the network side device to the UE exceeds $N_0$, the following actions of the UE can be defined as: discard the RIV data received this time; or, use the starting RB corresponding to the RIV as the starting location of the resource, and use a preset value as the length of the resource, such as $\min(N_{RB}-RB_{start},N_0)$. The above actions (i.e., discard the RIV data received this time; or, use the starting RB corresponding to the RIV as the starting location of the resource, and use a preset value as the length of the resource length) are also applicable to the following situation, i.e., in the resource assignment of an uplink scheduling signaling (UL grant) in a random access response (RAR) message received by the UE, the length of the assigned resource exceeds the length of the RB that is supported by the UE.

In the embodiment, for the solution of the DCI, the solution in the above embodiment may be referred to. In order to save pages, the details won't be repeated hereinafter.

From the above, the embodiment of the present invention provides a method for obtaining resource assignment for a UE which supports a reduced bandwidth, according to the method, when obtaining the resource assignment, the obtained resource indication value is calculated according to the number $N_0$ of the RB which the network side device of the communication system can assign to one UE and the one UE can schedule in maximum, thus being capable of saving the number of bits used for the resource indication and lowering the signaling cost.

Embodiment 3

The present embodiment assumes the UE is only able to support narrowband in downlink, and the narrowband is baseband. A narrowband PDCCH is used for the control information of the UE, such as an enhanced PDCCH (e-PDCCH), for a transmitting condition, the PDSCH is also only able to be transmitted within this narrowband. For example, suppose UE only supports $N_0$ RB in the narrowband, then a narrowband PDCCH and corresponding PDSCH also can only be transmitted within the $N_0$ RB.

Figure 3:
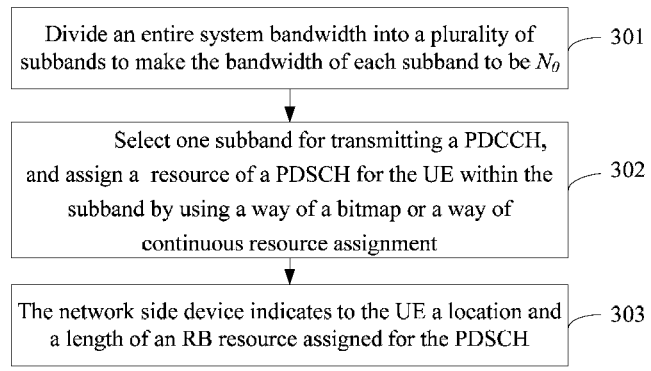
FIG. 3 is a flow diagram of another method for indicating resource assignment according to an embodiment of the present invention.

A method for assigning a resource of the UE provided by the embodiment includes the following steps, as shown in FIG. 3.

301, divide an entire system bandwidth into a plurality of subbands, and make the bandwidth of each subband to be $N_0$.

When the UE only supports narrowband with a bandwidth of $N_0$, the network side device of the communication system can divide the entire system bandwidth into a plurality of subbands and make the bandwidth of each subband to be $N_0$.

302, select one subband for transmitting a PDCCH, and assign a resource of a PDSCH to the UE within the subband by using a way of a bitmap or a way of continuous resource assignment.

In the embodiment, the PDSCH should also be within the subband where the PDCCH locates, and therefore the resource block assignment in the DCI needs not to assign on the entire system bandwidth, but only needs to assign within the subband where the PDCCH locates. Two resource assignment ways can be used to assign a resource for the PDSCH, one is a way of using a bitmap, and the other is a way of using continuous resource assignment.

303, the network side device indicates to the UE a location and a length of an RB resource assigned for the PDSCH.

In the step, for the PDCCH, the UE can obtain the location of the PDCCH by following ways:

According to an embodiment, the network side device, such as a base station, can calculate the subband where the PDCCH locates by using a narrowband PDCCH frequency hopping formula, at this time, the location of the subband may need not to be indicated to the UE. The UE can calculate the location of the subband by using the same narrowband PDCCH frequency hopping formula.

According to another embodiment, the network side device, such as a base station, can use the DCI information of the last previous PDCCH to indicate, to the UE, the location of the subband where the PDCCH locates, i.e., the subband where the $N_0$ RB of the next PDCCH locates.

However, the location of the RB assigned for the PDCCH in the subband may be a fixed location of the subband; or may also be indicated to the UE by other ways.

With regard to the PDSCH, because the subband where the PDSCH locates is the same as the subband where the PDCCH locates, the resource block assignment in the DCI needs not to assign on the entire system bandwidth, but only needs to assign within the subband where the PDCCH locates. Two resource assignment modes can be used for indication, one is that, when assigning a resource for the PDSCH by using the way of a bitmap, and when indicating to the UE the resource assigned for the PDSCH, it is required to use the bitmap to indicate to the UE the location of the resource assigned for the PDSCH. At this time, let $N_0=6$, indicating the resource assignment requires a signaling cost of 6 bits; another one is that, when assigning a resource for the PDSCH by using the way of continuous resource assignment, under such mode, let $N_0=6$, the RIV can be used to indicate the location of the resource assigned for the PDSCH, at this time, for the way of calculating the RIV, the way of calculating the RIV in the prior art can be referred to, i.e., calculating the RIV according to $N_{RB}$, however at this point $N_{RB}=N_0$; for example, a RIV calculation formula can be: when $L_{CRBs}-1 \leq \lceil N_{RB}/2 \rceil$, $RIV=N_{RB}(L_{CRBs}-1)+RB_{START}$, otherwise, $RIV=N_{RB}(N_{RB}-L_{CRBs}-1)+(N_{RB}-RB_{START}-1)$, at this time, let $N_0=6$, $N_{RB}=N_0=6$ $N_{RB}=N_0=6$, in addition, at this moment, $RB_{START}$ is a sequence number of the starting RB of the resource of the PDSCH within the subband. The number of bits required by the resource assignment is $\lceil \log_2(6 \times 5/2) \rceil=4$, a signaling cost of 4 bits being required.

Optionally, in the embodiment, the DCI used for uplink and downlink resource assignment indication can respectively use only one type of DCI format, where one DCI format used for PDSCH resource assignment is named as a first DCI, and another DCI format used for PUSCH resource grant is named as a second DCI.

Where, the DCI used for resource assignment can use an existing DCI format, for example, the Format 0. At this moment, there will be some spare bits or states in the DCI. Certainly, a new DCI format can be redesigned also.

In order to decrease the times that a UE performs blind detection in a specialized search space, a manner of setting a padding bit to 0 or 1 can be adopted to make the number of bits of the first DCI equal the number of bits of the second DCI. The padding bit can be all set to 0, or to 1, or to 0 and 1. Therefore, the times that the UE performs blind detection in the specialized search space can be reduced to half, thereby reducing the power consumption and DCI missed detection probability of the UE.

In the embodiment, the network side device can indicate the location of a next narrowband PDCCH using the spare bit or state in the DCI of the narrowband PDCCH. When the bandwidth of the system is 50 RBs and the bandwidth of the UE is 6 RBs, the number of bits required for indicating the location of the next narrowband PDCCH is $\lceil \log_2(50/6) \rceil=4$, at this moment, $RIV=RB_{START}/6$.

In addition, the network side device also can instruct the UE to start PDCCH frequency hopping or change a frequency hopping mode, by using the spare bit or state in the DCI of the narrowband PDCCH.

In addition, the network side device also can indicate discontinuous reception (DRX) information of the UE by using the spare bit or state in the DCI of the narrowband PDCCH.

According to the embodiment, the solution that may be used by the DCI format can be the same as the solution used in the embodiment one, in order to save pages, the details will not be repeated herein.

In summary, the embodiment of the present invention provides a method for indicating resource assignment with regard to a UE which only supports narrowband in downlink. By using the method of the embodiment, the resource assignment for the UE only supporting the narrowband can be realized, and the number of bits required for the resource assignment can be reduced. The executive entity of the method for assigning a resource of the embodiment may be a base station.

Embodiment 4

Correspondingly, based on the above embodiment three, the embodiment provides a method for assigning a resource, where assuming that the UE is only able to support narrowband in downlink, and the narrowband is baseband. The control information of the UE uses a narrowband PDCCH, such as an e-PDCCH, for the transmitting condition, the PDSCH is also only able to be transmitted within the narrowband. For example, suppose the UE in narrowband only support $N_0$ RB, the narrowband PDCCH and corresponding PDSCH also can only be transmitted within the $N_0$ RB.

A method for assigning a resource of the UE provided by the embodiment includes the following steps, and for corresponding figures thereof, please refer to steps 301 and 302 of FIG. 3.

401, divide an entire system bandwidth into a plurality of subbands and make the bandwidth of each subband to be $N_0$.

When the UE only supports narrowband with a bandwidth of $N_0$, the network side device of the communication system can divide the entire system bandwidth into a plurality of subbands to make the bandwidth of each subband be $N_0$.

402, select a subband for transmitting a PDCCH, and assign a resource of a PDSCH to the UE within the subband by using a way of a bitmap or a way of continuous resource assignment.

According to the embodiment, the PDSCH is also within the subband where the PDCCH locates, therefore, the resource block assignment in the DCI needs not to assign on the entire system bandwidth, nut only needs to assign within the subband where the PDCCH locates. Two resource assignment modes can be used to assign a resource for the PDSCH, one is to use a way of a bitmap, and the other is to use a way of continuous resource assignment.

In the embodiment, the solution that may be used for the DCI format can be the same as the solution of embodiment one, in order to save pages, the details will not be repeated herein.

In summary, the embodiment of the present invention provides a method for assigning a resource with regard to the UE that only supports narrowband in downlink. By using the method of the embodiment, the resource assignment for the UE only supporting the narrowband can be realized, and the number of bits required for the resource assignment can be reduced. The executive entity of the method for assigning a resource according to the embodiment may be a base station.

Embodiment 5

Figure 4:
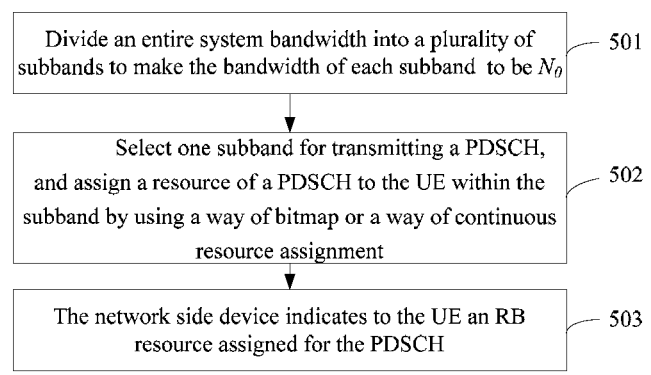
FIG. 4 is a flow diagram of still another method for indicating resource assignment according to an embodiment of the present invention.

The embodiment assumes that a UE supports broadband and can receive a conventional PDCCH. However, the PDSCH of the UE can only schedule narrowband, and the narrowband is baseband and corresponding to $N_0$ resource block RB. With regard to this type of UE, a method for indicating resource assignment provided by the embodiment includes the following steps, as shown in FIG. 4.

501, divide an entire system bandwidth into a plurality of subbands to make the bandwidth of each subband to be $N_0$.

When the UE only supports narrowband with a bandwidth of $N_0$, the network side device of the communication system can divide the entire system bandwidth into a plurality of subbands to make the bandwidth of each subband to be $N_0$.

502, select one subband for transmitting a PDSCH, and assign a resource of a PDSCH to the UE within the subband by using a way of a bitmap or a way of continuous resource assignment.

According to the embodiment, the PDSCH is within the subband, therefore, the resource block assignment in the DCI needs not to assign on the entire system bandwidth, but only needs to assign within the subband where the PDSCH locates. Two resource assignment modes can be used to assign a resource for PDSCH, one is a way of using a bitmap, and the other is a way of using continuous resource assignment.

503, the network side device indicates to the UE an RB resource assigned for the PDSCH.

According to an embodiment, the network side device, such as a base station, can calculate and obtain the subband where the PDCCH locates using a narrowband PDCCH frequency hopping formula, at this moment, it is not necessary to indicate to the UE the location of the subband. The UE can calculate out the location of the subband by using the same narrowband PDCCH frequency hopping formula.

According to another embodiment, the network side device, such as a base station, can indicate the location of the subband where the PDSCH locates to the UE by using a last preset subband identifier.

Two resource assignment ways can be used to indicate a location of the PDSCH resource in the subband, one is that when assigning the resource for the PDSCH by using the way of the bitmap, and when indicating to the UE the resource assigned for the PDSCH, it is required to use the bitmap to indicate to the UE the location of the resource assigned for the PDSCH. At this moment, let $N_0=6$, indicating the resource assignment requires a signaling cost of 6 bits; another one is that, when assigning the resource for the PDSCH by using the way of continuous resource assignment, under such mode, let $N_0=6$, the RIV can be used to indicate the location of the resource assigned for the PDSCH, at the moment, with respect to the way of calculating the RIV, reference can be made to the way of calculating the RIV in the prior art, i.e., calculating the RIV according to $N_{RB}$, however at the moment $N_{RB}=N_0$; for example, a RIV calculation formula can be: when $L_{CRBs}-1 \leq \lfloor N_{RB}/2 \rfloor$, $RIV=N_{RB}(L_{CRBs}-1)+RB_{START}$, otherwise, $RIV=N_{RB}(N_{RB}-L_{CRBs}+1)+(N_{RB}-RB_{START}-1)$, at this time, let $N_0=6$, $N_{RB}=N_0=6$, in addition, at this moment, $RB_{START}$ is a sequence number of a starting RB of the resource of the PDSCH within the subband. The number of bits required for the resource assignment is $\lceil \log_2(6 \times 5/2) \rceil = 4$, a signaling cost of 4 bits being required.

Based on the above embodiment five, a corresponding method for assigning a resource provided by the embodiment with regard to this type of UE includes the following steps, refer to steps 501 and 502 in FIG. 4.

501, divide an entire system bandwidth into a plurality of subbands to make the bandwidth of each subband to be $N_0$.

When the UE only supports narrowband with a bandwidth of $N_0$, the network side device of the communication system can divide the entire system bandwidth into a plurality of subbands to make the bandwidth of each subband to be $N_0$.

502, select a subband for transmitting a PDSCH, and assign a resource of PDSCH to the UE within the subband by using a way of a bitmap or a way of continuous resource assignment.

In the embodiment, the solution that may be used for the DCI format can be the same as the solution of embodiment one, in order to save pages, the details will not be repeated herein.

In summary, the embodiment of the present invention provides a method for assigning a resource with regard to the UE with limited scheduling bandwidth. By using the method of the embodiment, the resource assignment for the UE only supporting the narrowband can be realized, and the number of bits required for the resource assignment can be reduced. The executive entity of the method for assigning a resource according to the embodiment can be a base station.

Embodiment 6

Figure 5:
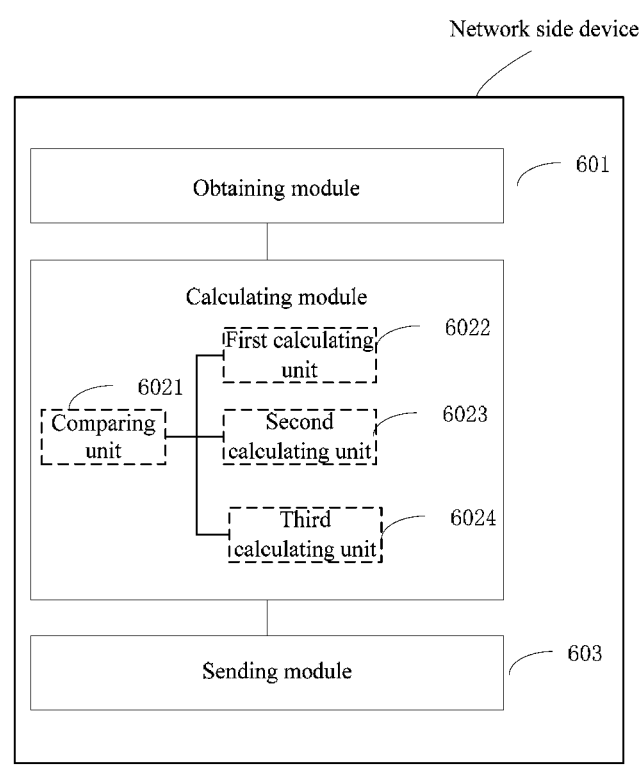
FIG. 5 is a block diagram of a network side device according to an embodiment of the present invention.

Based on the above embodiment one, the present embodiment provides a network side device, as shown in FIG. 5, including:

an obtaining module 601, configured to obtain the number $N_0$ of an RB which the network side device can assign to one user equipment and the one user equipment can schedule in maximum;

a calculating module 602, configured to calculate a resource indication value RIV according to the number $N_0$ of the RB which the network side device can assign to the UE and the UE can schedule in maximum and the number $N_{RB}$ of resource blocks corresponding to a bandwidth that the network side device can assign to all UEs for use; and a sending module 603, configured to send the calculated resource indication value RIV to the one user equipment.

Where, when the above calculating module 602 calculates the RIV according to the $N_{RB}$ and the $N_0$, the number $n_{bit}$ of binary bits for denoting the calculated RIV satisfies $n_{bit} = \lceil \log_2((N_{RB}-N_0-1) \times N_0 + N_0(N_0-1)/2) \rceil$.

Where, the calculating module 602 includes:

a comparing unit 6021, configured to compare $RB_{START}$ and $N_{RB}-N_0$, if $RB_{START} \leq N_{RB}-N_0$, then instruct a first calculating unit; and the first calculating unit 6022, configured to let $RIV = RB_{START} N_0 + L_{CRBs} - 1$, or $RIV = RB_{START} N_0 + L_{CRBs} - 1 + a$, where $L_{CRBs} \leq N_0$, a is an integer constant, the value range of a is $0 \leq a \leq N_{RB} - [(N_{RB}-N_0)N_0 + N_0 - 1]$.

Where, the calculating module 602 includes:

a comparing unit 6021, configured to compare $RB_{START}$ and $N_{RB}-N_0$, if $RB_{START} > N_{RB}-N_0$, further compare $L_{CRBs}-1$ and $\lfloor (N_0-1)/2 \rfloor$; and if $L_{CRBs}-1 \leq \lfloor (N_0-1)/2 \rfloor$, then instruct a second calculating unit;

the second calculating unit 6023, configured to let $RIV = N_0(N_{RB}-N_0+1)+(N_0-1)(L_{CRBs}-1)+RB_{START}-(N_{RB}-N_0+1)$, or, let $RIV = N_0(N_{RB}-N_0+1)+(N_0-1)(L_{CRBs}-1)+RB_{START}-(N_{RB}-N_0+1)+b$;

Where, $1 \leq L_{CRBs} \leq N_{RB}-RB_{start}$, b is an integer constant, and the b enables the RIV calculated with $RIV = N_0(N_{RB}-N_0+1)+(N_0-1)(L_{CRBs}-1)+RB_{START}-(N_{RB}-N_0+1)+b$ to be within $[0, N_{RB}]$.

Where, the calculating module 602 includes:

a comparing unit 6021, configured to compare $RB_{START}$ and $N_{RB}-N_0$, if $RB_{START} > N_{RB}-N_0$, further compare $L_{CRBs}-1$ and $\lfloor (N_0-1)/2 \rfloor$; if $L_{CRBs}-1 > \lfloor (N_0-1)/2 \rfloor$, then instruct a third calculating unit;

the third calculating unit 6024, configured to let $RIV = N_0(N_{RB}-N_0+1)+(N_0-1)(N_0-L_{CRBs})+N_{RB}-RB_{START}-1$, or, let $RIV = N_0(N_{RB}-N_0+1)+(N_0-1)(N_0-L_{CRBs})+N_{RB}-RB_{START}-1+c$;

Where, $1 \leq L_{CRBs} \leq N_{RB}-RB_{START}$, c is an integer constant, and the c enables the RIV calculated with $RIV = N_0(N_{RB}-N_0+1)+(N_0-1)(N_0-L_{CRBs})+N_{RB}-RB_{START}-1+c$ to be within $[0, N_{RB}]$.

Where, when the sending module 603 sends the calculated resource indication value RIV to the user equipment, the resource indication value RIV is carried in downlink control information DCI of a physical downlink control channel PDCCH, and is sent to the user equipment through the DCI.

Where, the downlink control information DCI includes a first DCI used for a physical downlink shared channel PDSCH and a second DCI used for a physical uplink shared channel PUSCH.

The sending module 603 is also configured to make the number of bits of the first DCI to be equal to that of the second DCI by using a way of padding a bit.

The sending module 603 is also configured to set all spare bit in the DCI to 0 or 1.

Where, the spare bit in the DCI indicates discontinuous reception DRX information of the user equipment.

Where, the sending module 603 indicating discontinuous reception DRX information of the user equipment by using a spare bit in the DCI includes one or any combination of the following ways:

Indicating a longer sleep time of the DRX by using the spare bit, where the longer sleep time of the DRX is longer than a sleep time of the DRX specified by an existing long term evolution LTE protocol;

The spare bit indicates whether to use the longer sleep time of the DRX;

The spare bit indicates when to start the longer sleep time of the DRX;

The spare bit is used to repeat an information bit in the DCI.

Where, what the RIV indicates is a location of a continuous physical resource block and a length of the resource block.

Or, what the RIV indicates is a location of a continuous virtual resource block VRB and a length of the resource block; the sending module 603 indicates whether to use a distributed virtual resource block VRB mapping by using a localized/distributed virtual resource block VRB assignment flag in the downlink control information DCI.

For the specific working process of the above network side device, reference can be made to the corresponding process in the previous method embodiment, and the details will not be repeated herein.

In summary, the embodiment of the present invention provides a network side device, which takes into account the maximum number of the resource block supported by the user equipment in the calculation of the resource indication value, the number of bits used for the resource indication can be saved and the signaling cost is reduced. The device for indicating resource assignment specifically can be a base station.

Embodiment 7

Figure 6:
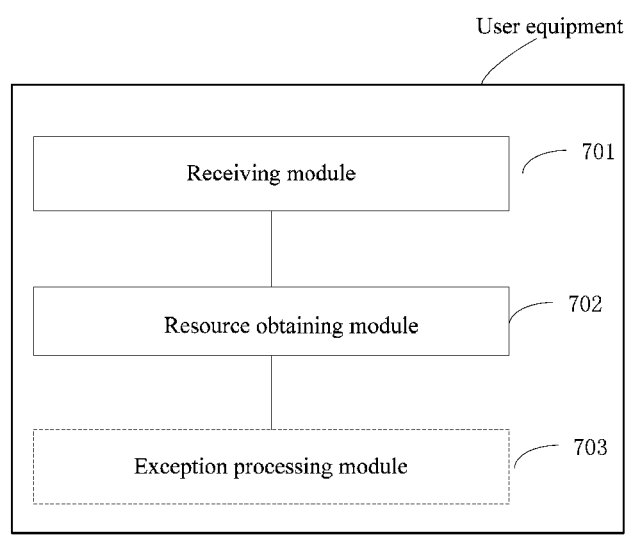
FIG. 6 is a flow diagram of a user equipment according to an embodiment of the present invention.

Please refer to FIG. 6, the embodiment of the present invention provides a UE, including:

a receiving module 701, configured to receive a resource indication value RIV sent by a network side device, where the resource indication value RIV is calculated by the network side device according to the number $N_0$ of an RB which the network side device can assign to the user equipment UE and the UE can schedule in maximum and the number $N_{RB}$ of radio blocks corresponding to a bandwidth that the network side device can assign to all UEs for use; and a resource obtaining module 702, configured to obtain a location of a resource assigned to the user equipment and a length $L_{CRBs}$ of the resource according to the RIV received.

Where, in the resource indication value RIV sent by the network side device received by the receiving module 701, the number $n_{bit}$ of binary bits for denoting the RIV satisfies $n_{bit} = \lceil \log_2((N_{RB}-N_0+1) \times N_0 + N_0(N_0-1)/2) \rceil$.

According to the embodiment, the UE can also include:

an exception processing module 703, configured to discard, when the length $L_{CRBs}$ of the resource assigned by the network side device, which is obtained by the resource obtaining module, exceeds the number $N_0$ of the RB which the network side device can assign to the UE and the UE can schedule in maximum, data of the RIV received this time; or, to use a location corresponding to the RIV as the location of the RIV, and to use a preset value as the length of the resource.

For the specific working process of the above user equipment, reference can be made to the corresponding process in the previous method embodiments, and the details will not be repeated herein.

In summary, the embodiment of the present invention provides a user equipment with regard to the UE that only supports narrowband in downlink. It may realize the resource assignment for the UE that only supports the narrowband, and may reduce the number of bits required for the resource assignment.

Embodiment 8

Figure 7:
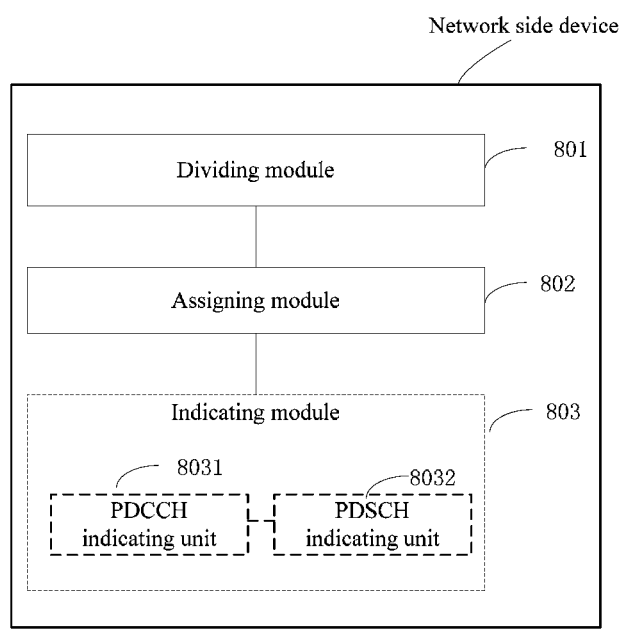
FIG. 7 is a block diagram of another network side device according to an embodiment of the present invention.

Please refer to FIG. 7, the embodiment of the present invention also provides a network side device, including:

a dividing module 801, configured to divide, when a user equipment UE can only support narrowband in downlink and the narrowband is baseband and corresponds to $N_0$ resource block RB, an entire system bandwidth into a plurality of subbands to make a bandwidth of each subband to be $N_0$;

an assigning module 802, configured to select one subband for transmitting a physical downlink control channel PDCCH, and assign a resource of a physical downlink shared channel PDSCH to the UE within the one subband by using a way of a bitmap or a way of continuous resource assignment.

In addition, the network side device can also include:

an indicating module 803, configured to indicate to the UE a location and a length of an RB resource assigned for the PDSCH.

Where, the assigning module is also configured to calculate a subband where the PDCCH locates by using a narrowband PDCCH frequency hopping formula.

Where, the indicating module 803 includes:

a PDCCH indicating unit 8031, configured to indicate to the UE the subband where the $N_0$ RB of the PDCCH locate by using downlink control information of a last PDCCH of the PDCCH.

Where, the indicating module 803 includes:

a PDSCH indicating unit 8032, configured to indicate to the UE, when assigning the resource for the PDSCH uses the way of the bitmap, the location of the resource assigned for the PDSCH by using the bitmap.

Where, the indicating module 803 includes:

a PDSCH indicating unit, configured to indicate, when assigning the resource for the PDSCH uses the way of the continuous resource assignment, the location of the resource assigned for the PDSCH by using a resource indication value RIV, where the RIV is calculated according to the $N_0$ and a starting location of the resource of the PDSCH within the subband.

For the specific working process of the above network side device, reference can be made to the corresponding process in the previous method embodiments. The technical effects which can be achieved are the same as those of the previous method embodiments, and the details will not be repeated herein.

Embodiment 9

Figure 8:
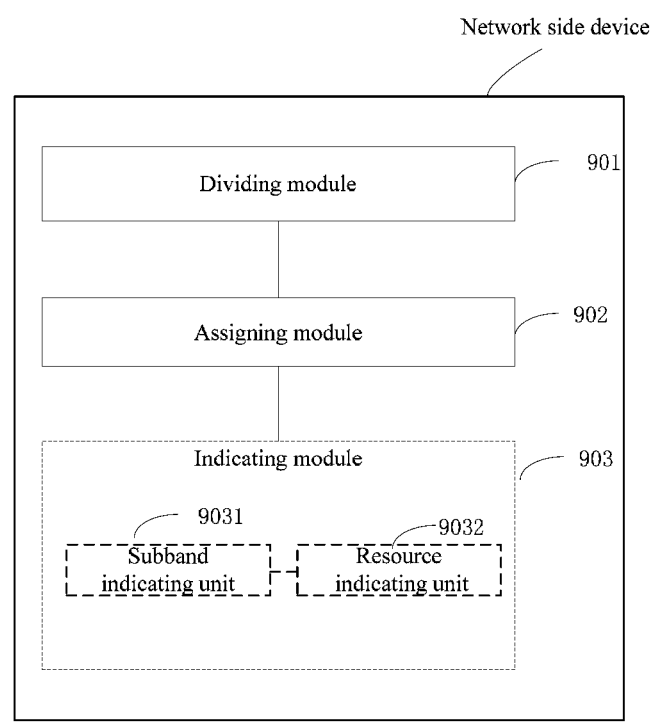
FIG. 8 is a block diagram of still another network side device according to an embodiment of the present invention.

The embodiment of the present invention also provides a network side device. Please refer to FIG. 8 for the schematic block diagram of the network side device, which includes:

a dividing module 901, configured to divide, when a physical downlink control channel of a user equipment UE can support broadband, but a physical downlink shared channel PDSCH of the UE only can schedule narrowband and the narrowband is baseband and corresponds to $N_0$ resource block RB, an entire system bandwidth into a plurality of subbands to make a bandwidth of each subband to be $N_0$;

an assigning module 902, configured to select one subband for transmitting the PDSCH, and assign to the UE a resource of the physical downlink shared channel PDSCH within the one subband by using a way of a bitmap or a way of continuous resource assignment.

In addition, the network side device can also include:

an indicating module 903, configured to indicate a location and a length of an RB resource assigned for the PDSCH.

Where, the assigning module 902 is also configured to calculate a subband where the PDSCH locates by using a narrowband PDSCH frequency hopping formula.

Where, the indicating module 903 includes:

a subband indicating unit 9031, configured to indicate the subband where $N_0$ RB of the PDSCH locate, to the UE, by using a preset subband identifier.

Where, the indicating module 903 includes:

a resource indicating unit 9032, configured to indicate, to the UE, when the way of the bitmap is used to assign the resource for the PDSCH, the location of the resource assigned for the PDSCH by using the bitmap.

Where, the indicating module 903 includes:

a resource indicating unit 9032, configured to indicate, when assigning the resource for the PDSCH uses the way of the continuous resource assignment, the location of the resource assigned for the PDSCH by using a resource indication value RIV, where the RIV is calculated according to the $N_0$ and a starting location of the resource of the PDSCH within the subband.

For the specific working process of the above network side device, reference can be made to the corresponding process in the previous method embodiments. The technical effects which can be achieved are the same as those of the previous method embodiments, and the details will not be repeated herein.

It should be noted that, in the above method and device embodiments, the division of the function modules is set forth as examples, in practical application, the above functions may be assigned to different function modules to be accomplished according to requirements, for example, configuration requirements of corresponding hardware or consideration on convenient implementation of software, i.e., divide the inner structure of the device into different function modules so as to accomplish the entire or part functions as set forth above. In addition, in practical application, corresponding function modules in the embodiments can be implemented by corresponding hardware, such as a transceiver, a processor, etc, or be accomplished by corresponding hardware executing corresponding software (the principle set forth above is applicable to each embodiment provided by the description).

A person skilled in the art may understand that all or part steps in all methods of the above embodiments can be accomplished by a program instructing related hardware, for example, one or multiple or all of the following methods:

Method one, including:

A network side device obtains a number $N_0$ of an RB which the network side device can assign to one UE and the one UE can schedule in maximum;

The network side device calculates a resource indication value RIV according to the number $N_0$ of the RB which the network side device can assign to the UE and the UE can schedule in maximum and the number $N_{RB}$ of resource blocks corresponding to a bandwidth which the network side device can assign to all UEs for use; and Send the calculated resource indication value RIV to the one user equipment.

Method two, including:

A user equipment UE receives a resource indication value RIV sent by a network side device, where the resource indication value RIV is a resource indication value RIV calculated by the network side device according to the number $N_0$ of an RB which the network side device can assign to the UE and the UE can schedule in maximum and the number $N_{RB}$ of resource blocks corresponding to a bandwidth which the network side device can assign to all UEs for use; and The UE obtains a location of a resource assigned to the user equipment and a length $L_{CRBs}$ of the resource according to the received RIV.

Method three, including:

When the user equipment UE can only support narrowband in downlink, and the narrowband is baseband and corresponds to $N_0$ resource block RB, the method includes:

Divide an entire system bandwidth into a plurality of subbands to make a bandwidth of each subband to be $N_0$;

Select one subband for transmitting a physical downlink control channel PDCCH, and assign to the UE a resource of a physical downlink shared channel PDSCH within the one subband by using a way of a bitmap or a way of continuous resource assignment.

Method four, including:

Divide an entire system bandwidth into a plurality of subbands to make a bandwidth of each subband to be $N_0$;

Select one subband for transmitting the PDSCH, and assign to the UE a resource of a physical downlink shared channel PDSCH within the one subband by using a way of a bitmap or a way of continuous resource assignment.

A person skilled in the art may understand that the entire or part steps in each method of the above embodiments can be implemented by a program instructing related hardware, and the program may be stored in a computer readable storage medium, and the storage medium may include: a read only memory (ROM), a random access memory (RAM), a magnetic disk or an optical disk etc.

The above sets forth the method for indicating resource assignment of UE, the method for assigning a resource, and corresponding devices provided by the embodiments of the present invention, however, the description of the above embodiments is only for facilitating to understand the method and the core ideas of the present invention, and shall not be interpreted as limitations of the present invention. A person skilled in the art may easily conceive of changes or replacements within the technical scope disclosed by the present invention, which shall be included in the protection scope of the present invention.

What is claimed is:

1. A method for indicating resource assignment, comprising:

obtaining, by a network side device, a number $N_0$ of a resource block (RB), where the number $N_0$ of the RB is a number of an RB that the network side device can assign to a user equipment (UE) and the UE can schedule in maximum;

calculating, by the network side device, a resource indication value (RIV) according to the $N_0$ of the UE and a number $N_{RB}$ of RBs corresponding to a bandwidth that the network side device can assign to all UEs accessing to the network side device for use, wherein in calculating the RIV according to the $N_{RB}$ and the $N_0$, a number $n_{bit}$ of binary bits for denoting the calculated RIV satisfies the following formula $n_{bit} = \lceil \log_2((N_{RB} - N_0 + 1) \times N_0 + N_0(N_0 - 1)/2) \rceil$; and sending, by the network side device, the RIV to the UE.

2. The method according to claim 1, wherein the calculating the RIV comprises:

comparing $RB_{START}$ and $N_{RB} - N_0$, wherein the $RB_{START}$ is a sequence number of a starting RB in the $N_{RB}$ RBs, if $RB_{START} \leq N_{RB} - N_0$, then calculating the RIV according to the following formula:

$RIV = RB_{START} N_0 + L_{CRBs} - 1 + a$, wherein $L_{CRBs} \leq N_0$, a is an integer constant, and a value range of a is $0 \leq a \leq N_{RB} - [(N_{RB} - N_0) N_0 + N_0 - 1]$, wherein the $L_{CRBs}$ is a number $L_{CRBs}$ of a continuous resource block assigned to the UE for scheduling, $1 \leq L_{CRBs} \leq N_{RB} \leq RB_{start}$, and the number $L_{CRBs}$ represents a length of a resource assigned to the UE.

3. The method according to claim 1, wherein the calculating the RIV comprises:

comparing $RB_{START}$ and $N_{RB} - N_0$, wherein $RB_{START}$ is a sequence number of a starting RB in the $N_{RB}$ RBs, if $RB_{START} > N_{RB} - N_0$, then further comparing $L_{CRBs} - 1$ and $\lfloor (N_0 - 1)/2 \rfloor$, wherein the $L_{CRBs}$ is a number $L_{CRBs}$ of a continuous resource block assigned to the UE for scheduling, $1 \leq L_{CRBs} \leq N_{RB} - RB_{start}$, the number $L_{CRBs}$ represents a length of a resource assigned to the UE; and if $L_{CRBs} - 1 \leq \lfloor (N_0 - 1)/2 \rfloor$, then calculating the RIV according to one of the following formulas $RIV = N_0(N_{RB} - N_0 + 1) + (N_0 - 1)(L_{CRBs} - 1) + RB_{START} - (N_{RB} - N_0 + 1)$, and $RIV = N_0(N_{RB} - N_0 + 1) + (N_0 - 1)(L_{CRBs} - 1) + RB_{START} - (N_{RB} - N_0 + 1) + b$;

wherein $1 \leq L_{CRBs} \leq N_{RB} - RB_{START}$, b is an integer constant, and the b enables the RIV obtained according to the following formula $RIV = N_0(N_{RB} - N_0 + 1) + (N_0 - 1)(L_{CRBs} - 1) + RB_{START}(N_{RB} - N_0 + 1) + b$ to be within $[0, N_{RB}]$.

4. The method according to claim 1, wherein the calculating the RIV comprises:

comparing $RB_{START}$ and $N_{RB} - N_0$, wherein the $RB_{START}$ is a sequence number of a starting RB in the $N_{RB}$ RBs, if $RB_{START} > N_{RB} - N_0$, then further comparing $L_{CRBs} - 1$ and $\lfloor (N_0 - 1)/2 \rfloor$, wherein the $L_{CRBs}$ is a number $L_{CRBs}$ of a continuous resource block assigned to the UE for scheduling, $1 \leq L_{CRBs} \leq N_{RB} - RB_{start}$, and the number $L_{CRBs}$ represents a length of a resource assigned to the UE; and if $L_{CRBs} - 1 > \lfloor (N_0 - 1)/2 \rfloor$, then calculating the RIV according to one of the following formulas $RIV = N_0(N_{RB} - N_0 + 1) + (N_0 - 1)(N_0 - L_{CRBs}) + N_{RB} - RB_{START} - 1$, and $RIV = N_0(N_{RB} - N_0 + 1) + (N_0 - 1)(N_0 - L_{CRBs}) + N_{RB} - RB_{START} - 1 + c$;

wherein c is an integer constant, and the c enables the RIV obtained according to the following formula $RIV = N_0(N_{RB} - N_0 + 1) + (N_0 - 1)(N_0 - L_{CRBs}) + N_{RB} - RB_{START} - 1 + c$ to be within $[0, N_{RB}]$.

5. The method according to claim 1, wherein the sending the calculated RIV to the UE comprises:

sending downlink control information (DCI) of a physical downlink control channel (PDCCH) to the UE, wherein the DCI carries the RIV.

6. A network side device, comprising a processor and a computer-readable medium for storing program codes, which, when executed by the processor, cause the processor to:

obtain a number $N_0$ of a resource block (RB), wherein the number $N_0$ of the RB is a number of an RB that the network side device can assign to a user equipment (UE) and the UE can schedule in maximum;

calculate a resource indication value (RIV) according to a number $N_{RB}$ of RBs corresponding to a bandwidth that the network side device can assign to all UEs accessing to the network side device for use and the $N_0$ obtained by the obtaining module, and calculate the RIV according to $N_{RB}$ and the $N_0$ as follows: a number $n_{bit}$ of binary bits for denoting the calculated RIV satisfies the following formula $n_{bit} = \lceil \log_2((N_{RB} - N_0 + 1) \times N_0 + N_0(N_0 - 1)/2) \rceil$; and send the RIV calculated by the calculating module to the UE.

7. The network side device according to claim 6, wherein the program codes further cause the processor to:

compare $RB_{START}$ and $N_{RB} - N_0$, wherein the $RB_{START}$ is a sequence number of a starting RB in the $N_{RB}$ RBs; and if obtaining $RB_{START} \leq N_{RB} - N_0$, then calculate the RIV according to the following formula $RIV = RB_{START} N_0 + L_{CRBs} - 1 + a$, wherein the $L_{CRBs}$ is a number $L_{CRBs}$ of a continuous resource block assigned to the UE for scheduling, and the number $L_{CRBs}$ represents a length of a resource assigned to the UE, $L_{CRBs} N_0$, a is an integer constant, a value range of a is $0 \leq a \leq N_{RB} - [(N_{RB} - N_0)N_0 + N_0 - 1]$.

8. The network side device according to claim 6, wherein the program codes further cause the processor to:

compare $RB_{START}$ and $N_{RB} - N_0$, wherein $RB_{START}$ is a sequence number of a starting RB in the $N_{RB}$ RBs, and if $RB_{START} > N_{RB} - N_0$, then further compare $L_{CRBs} - 1$ and $\lfloor (N_0 - 1)/2 \rfloor$, the $L_{CRBs}$ is a number $L_{CRBs}$ of a continuous resource block assigned to the UE for scheduling, and the number $L_{CRBs}$ represents a length of a resource assigned to the UE, $1 \leq L_{CRBs} \leq N_{RB} - RB_{start}$;

if obtaining $L_{CRBs} - 1 \leq \lfloor (N_0 - 1)/2 \rfloor$, then calculate the RIV according to one of the following formulas $RIV = N_0(N_{RB} - N_0 + 1) + (N_0 - 1)(L_{CRBs} - 1) + RB_{START} - (N_{RB} - N_0 + 1)$ and $RIV = N_0(N_{RB} - N_0 + 1) + (N_0 - 1)(L_{CRBs} - 1) + RB_{START} - (N_{RB} - N_0 + 1) + b$;

wherein b is an integer constant, and the b enables the RIV obtained according to the following formula $RIV = N_0(N_{RB} - N_0 + 1) + (N_0 - 1)(L_{CRBs} - 1) + RB_{START} - (N_{RB} - N_0 + 1) + b$ to be within $[0, N_{RB}]$.

9. The network side device according to claim 6 wherein the program codes further cause the processor to:

compare $RB_{START}$ and $N_{RB} - N_0$, wherein $RB_{START}$ is a sequence number of a starting RB in the $N_{RB}$ RBs, and if $RB_{START} > N_{RB} - N_0$, then further compare $L_{CRBs} - 1$ and $\lfloor (N_0 - 1)/2 \rfloor$, wherein the $L_{CRBs}$ is a number $L_{CRBs}$ of a continuous resource block assigned to the UE for scheduling, and the number $L_{CRBs}$ represents a length of a resource assigned to the UE, $1 \leq L_{CRBs} \leq N_{RB} - RB_{START}$;

if obtaining $L_{CRBs} - 1 > \lfloor (N_0 - 1)/2 \rfloor$, then calculating the RIV according to one of the formulas $RIV = N_0(N_{RB} - N_0 + 1) + (N_0 - 1)(N_0 - L_{CRBs}) + N_{RB} - RB_{START} - 1$ and $RIV = N_0(N_{RB} - N_0 + 1) + (N_0 - 1)(N_0 - L_{CRBs}) + N_{RB} - RB_{START} - 1 + c$;

wherein c is an integer constant, and the c enables the RIV obtained according to the formula $RIV = N_0(N_{RB} - N_0 + 1) + (N_0 - 1)(N_0 - L_{CRBs}) + N_{RB} - RB_{START} - 1 + c$ to be within $[0, N_{RB}]$.

10. The network side device according to claim 6, wherein the program codes further cause the processor to send the calculated RIV to the UE as follows:

sending downlink control information (DCI) of a physical downlink control channel (PDCCH) to the UE, wherein the DCI carries the RIV.

11. The network side device according to claim 6, wherein the RIV indicates a location of continuous physical resource blocks and a length of the RB.

12. The network side device according to claim 6, wherein the RIV indicates a location of continuous virtual resource blocks (VRB) and a length of the RB.

13. A method for obtaining resource assignment, comprising:

receiving, by a user equipment (UE), a resource indication value (RIV) sent by a network side device, wherein the RIV is calculated by the network side device according to a number $N_0$ of a resource block (RB) and a number $N_{RB}$ of RBs corresponding to a bandwidth that the network side device can assign to all UEs accessing to the network side device for use, the number $N_0$ of the RB is a number of an RB that the network side device can assign to the UE and the UE can schedule in maximum, wherein in receiving by the UE the RIV sent by the network side device, a number $n_{bit}$ of binary bits for denoting the RIV satisfies the following formula $n_{bit} = \lceil \log_2((N_{RB} - N_0 + 1) \times N_0 + N_0(N_0 - 1)/2) \rceil$; and obtaining, by the UE, a location of a resource assigned to the user equipment and a length $L_{CRBs}$ of the resource according to the received RIV.

14. The method according to claim 13, further comprising at least one of the following:

(a) if the length $L_{CRBs}$ of the resource assigned by the network side device to the UE, exceeds the number $N_0$ of the RB, discarding, by the UE, the RIV; and (b) using a location corresponding to the RIV as the location of the resource, and using a preset value as the length $L_{CRBs}$ of the resource.

15. A user equipment (UE), comprising a processor and a computer-readable medium for storing program codes, which, when executed by the processor, cause the processor to:

receive a resource indication value (RIV) sent by a network side device, wherein the RIV is calculated by the network side device according to a number $N_0$ of a resource block (RB), and a number $N_{RB}$ of RBs corresponding to a bandwidth that the network side device can assign to all UEs accessing to the network side device for use, the number $N_0$ of the RB is a number of an RB that the network side device can assign to UE and the UE can schedule in maximum, wherein in the RIV sent b the network side device a number $n_{bit}$ of binary bits for denoting the RIV satisfies the following formula $n_{bit} = \lceil \log_2((N_{RB} - N_0 + 1) \times N_0 + N_0(N_0 - 1)/2) \rceil$; and obtain a location of a resource assigned to the UE and a length $L_{CRBs}$ of the resource according to the RIV received by the receiving module.

16. The user equipment according to claim 15, wherein the program codes further cause the processor to:

implement one of the following:

(a) discarding, if the length $L_{CRBs}$ of the resource assigned by the network side device to the UE, exceeds the number $N_0$ of the RB, the RIV received by the receiving module; and (b) using a location corresponding to the RIV as the location of the resource, and use a preset value as the length $L_{CRBs}$ of the resource.

* * * * *